(12) United States Patent
Sugiyama et al.

(10) Patent No.: US 9,229,292 B2
(45) Date of Patent: Jan. 5, 2016

(54) OPTICAL MODULE AND OPTICAL TRANSMITTER

(71) Applicant: FUJITSU OPTICAL COMPONENTS LIMITED, Kawasaki-shi, Kanagawa (JP)

(72) Inventors: Masaki Sugiyama, Sagamihara (JP); Seimi Sasaki, Sagamihara (JP); Takehito Tanaka, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/445,388

(22) Filed: Jul. 29, 2014

(65) Prior Publication Data
US 2015/0078763 A1    Mar. 19, 2015

(30) Foreign Application Priority Data

Sep. 13, 2013    (JP) .................................. 2013-190563

(51) Int. Cl.
*H04B 10/00*    (2013.01)
*G02F 1/225*    (2006.01)
*H04B 10/50*    (2013.01)
*H04B 10/532*    (2013.01)
*G02F 1/21*    (2006.01)

(52) U.S. Cl.
CPC .............. *G02F 1/225* (2013.01); *H04B 10/501* (2013.01); *H04B 10/532* (2013.01); *G02F 1/2255* (2013.01); *G02F 2001/212* (2013.01); *G02F 2201/16* (2013.01)

(58) Field of Classification Search
USPC ................................................ 398/182–201
See application file for complete search history.

(56) References Cited

U.S. PATENT DOCUMENTS

| 5,042,895 | A  | * | 8/1991  | Chouinard et al. ............... 385/2  |
| 5,148,503 | A  | * | 9/1992  | Skeie ................................. 385/3 |
| 5,208,697 | A  | * | 5/1993  | Schaffner et al. ............. 359/254 |
| 5,291,565 | A  | * | 3/1994  | Schaffner et al. ................. 385/3 |
| 6,192,167 | B1 | * | 2/2001  | Kissa et al. ........................ 385/3 |
| 6,483,953 | B1 | * | 11/2002 | McBrien et al. .................... 385/2 |
| 6,571,026 | B2 | * | 5/2003  | Kondo et al. ...................... 385/2 |
| 6,580,843 | B2 | * | 6/2003  | Doi et al. ......................... 385/14 |

(Continued)

FOREIGN PATENT DOCUMENTS

| JP | 2003-15096  | 1/2003  |
| JP | 2003-295139 | 10/2003 |

(Continued)

*Primary Examiner* — Agustin Bello
(74) *Attorney, Agent, or Firm* — Staas & Halsey LLP

(57) ABSTRACT

An optical module includes a waveguide substrate including an optical waveguide and electrodes that apply electronic signals to the optical waveguide; a relay substrate disposed adjacent to the waveguide substrate; a terminal substrate disposed adjacent to the waveguide substrate and opposite to the relay substrate across the waveguide substrate; and a carrier substrate on which the waveguide substrate, the relay substrate, and the terminal substrate are mounted. The electrodes have a first interconnect unit from the relay substrate to the terminal substrate via the waveguide substrate and second interconnect units from the first interconnect unit and branching on the terminal substrate. Among the second interconnect units, a first interconnect branch includes a capacitor and a terminal resistor; and a second interconnect branch is connected to an interconnect of the carrier substrate via a bias resistor, passes under the waveguide substrate to a DC electrode for bias-adjusting on the relay substrate.

14 Claims, 13 Drawing Sheets

(56) References Cited

U.S. PATENT DOCUMENTS

| | | | |
|---|---|---|---|
| 6,584,240 B2 * | 6/2003 | Doi et al. | 385/2 |
| 6,590,691 B1 * | 7/2003 | Nagra et al. | 359/237 |
| 6,678,428 B2 * | 1/2004 | Seino et al. | 385/2 |
| 6,734,755 B2 * | 5/2004 | Cites et al. | 333/33 |
| 6,741,378 B2 * | 5/2004 | Sugiyama et al. | 359/245 |
| 6,867,901 B2 * | 3/2005 | Sugiyama et al. | 359/322 |
| 6,961,494 B2 * | 11/2005 | Tanaka | 385/40 |
| 7,162,107 B2 * | 1/2007 | Bull et al. | 385/2 |
| 7,212,326 B2 * | 5/2007 | Wooten et | 359/245 |
| 7,245,788 B2 * | 7/2007 | Fujita et al. | 385/3 |
| 8,031,987 B2 * | 10/2011 | Shimizu et al. | 385/2 |
| 8,068,703 B2 * | 11/2011 | Shimizu et al. | 385/2 |
| 8,135,242 B2 * | 3/2012 | Sugiyama | 385/2 |
| 8,380,015 B2 * | 2/2013 | Kinpara et al. | 385/2 |
| 8,792,752 B2 * | 7/2014 | Shimizu et al. | 385/2 |
| 2002/0109897 A1 * | 8/2002 | Mirshekar-Syahkal et al. | 359/245 |
| 2003/0007228 A1 | 1/2003 | Shirai | |
| 2009/0252500 A1 * | 10/2009 | Shimizu et al. | 398/183 |
| 2010/0202723 A1 | 8/2010 | Sugiyama | |
| 2011/0026868 A1 * | 2/2011 | Shimizu et al. | 385/2 |
| 2015/0063809 A1 * | 3/2015 | Sugiyama et al. | 398/65 |
| 2015/0078763 A1 * | 3/2015 | Sugiyama et al. | 398/200 |

FOREIGN PATENT DOCUMENTS

| | | |
|---|---|---|
| JP | 2007-139987 | 6/2007 |
| JP | 2010-185979 | 8/2010 |

\* cited by examiner

OPTICAL MODULE AND OPTICAL TRANSMITTER

CROSS REFERENCE TO RELATED APPLICATIONS

This application is based upon and claims the benefit of priority of the prior Japanese Patent Application No. 2013-190563, filed on Sep. 13, 2013, the entire contents of which are incorporated herein by reference.

FIELD

The embodiments discussed herein are related to an optical module and an optical transmitter used in optical transmission.

BACKGROUND

An optical waveguide device using, for example, an electrooptical crystal substrate, such as an $LiNbO_3$ (LN) substrate and $LiTaO_2$ substrate, or a semiconductor substrate, such as GaAs substrate and InP substrate, is known as an optical module. This optical waveguide device is created by forming a metal film made of titanium (Ti) on part of the substrate and causing the film to thermally diffuse, or by executing proton exchange in a benzoic acid after patterning treatment. An electrode is then formed near the optical waveguide to construct the optical module, such as optical modulator.

When such an optical modulator is driven at high speed, the terminal of a signal electrode is assumed to be connected to the terminal of a ground electrode via resistance, thereby forming a traveling wave electrode, and a high-speed microwave signal (electronic signal) is applied from the input side to an RF terminal. At this time, an electric field shifts the refraction factors of a pair of parallel waveguides A and B by $+\Delta$ and $-\Delta$, respectively, which consequently shifts the phase difference between the parallel waveguides A and B. In this manner, the signal passing through a Mach-Zehnder interferometer is output from an outgoing waveguide, as intensity-modulated signal light.

By matching the speed of light and the speed of the high-speed microwave signal (electronic signal), high-speed optical response characteristics can be achieved. After traveling through the optical modulator, the electronic signal travels through a capacitor and is terminated at a terminal resistor. Before the capacitor, the electrode is branched into one portion that extends through a bias resistor to be connected to a DC terminal and the other portion that is terminated at a terminal resistor. The optical modulator with this configuration functions as a bias. By applying a voltage to the DC terminal, a bias point and a drive voltage of the Mach-Zehnder unit can be controlled.

Such an optical modulator includes a Mach-Zehnder modulator unit and a relay substrate to which an electronic signal for driving the Mach-Zehnder modulator unit is input. As a technique related to the relay substrate, for example, a technique is known according to which the Mach-Zehnder modulator unit is disposed between a signal input substrate and a signal terminating substrate having a terminal resistor, etc. (see, e.g., Japanese Laid-Open Patent Publication Nos. 2007-139987 and 2003-015096). Another technique is also known according to which a signal input substrate and a signal terminating substrate are disposed on one side of a modulator (see, e.g., Japanese Laid-Open Patent Publication No. 2003-295139). Still another technique is also known according to which a relay substrate is provided as a unit separated from to an optical modulator unit and electrode intervals between RF terminals on the relay substrate are widened (see, e.g., Japanese Laid-Open Patent Publication No. 2010-185979).

In recent years, accompanying advances in techniques for multi-value processing and optical-polarization division multiplexing aimed at large-capacity optical communication, the configuration of the modulator has become more complicated. For example, a modulation method is adopted for the modulator such that two sets of Mach-Zehnder modulator units each having a pair of parallel waveguides are provided and an independent signal is input to the two sets of Mach-Zehnder modulator units to generate multi-value signals multiplexed by optical-polarization division.

According to the configuration that includes the two sets of Mach-Zehnder modulator units, however, the number of signal paths for electronic signals is doubled on a substrate having the Mach-Zehnder modulator units, which brings about a need for space to arrange the signal paths. Accordingly, the number of RF terminals, DC terminals, capacitors, bias resistors, and terminal resistors is also doubled on the relay substrate. This brings about a problem in that the size of the relay substrate, e.g., a length along the parallel waveguides of the Mach-Zehnder modulator units increases and the size of a module accommodating the Mach-Zehnder modulator units increases as well.

SUMMARY

According to an aspect of an embodiment, an optical module includes a waveguide substrate including an optical waveguide and electrodes that apply an electronic signal to the optical waveguide; a relay substrate disposed adjacent to the waveguide substrate; a terminal substrate disposed adjacent to the waveguide substrate and opposite to the relay substrate across the waveguide substrate; and a carrier substrate on which the waveguide substrate, the relay substrate, and the terminal substrate are mounted. The electrodes have a first interconnect unit extending from the relay substrate to the terminal substrate via the waveguide substrate and second interconnect units extending from the first interconnect unit and branching on the terminal substrate. A first interconnect branch among the second interconnect units includes a capacitor and a terminal resistor, and a second interconnect branch among the second interconnect units is connected to an interconnect of the carrier substrate via a bias resistor, passes under the waveguide substrate, and extends to a DC electrode, bias-adjusting, on the relay substrate.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of an optical module and an optical transmitter will be explained in detail with reference to the accompanying drawings.

Figure 1:
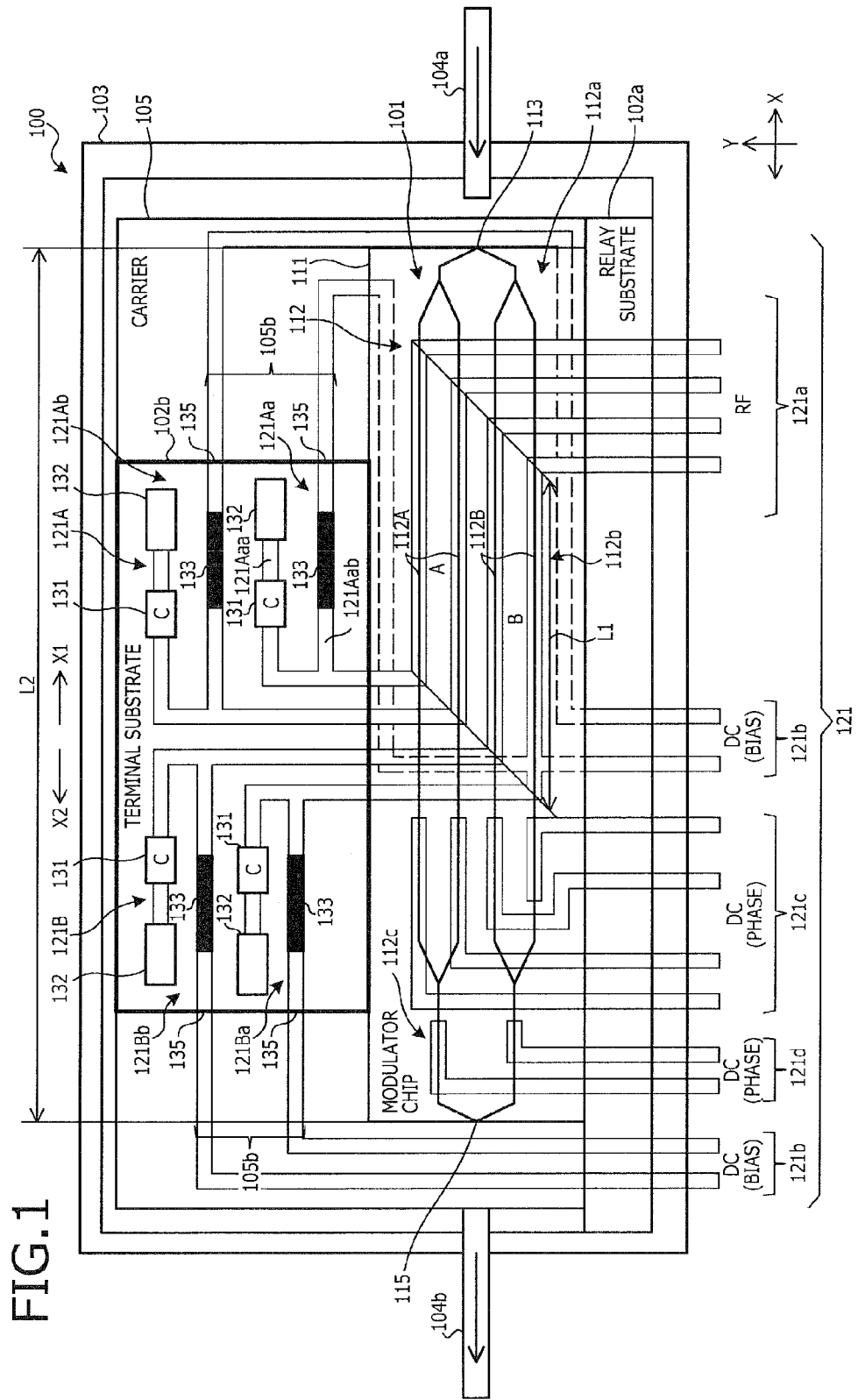
FIG. 1 is a top view of an optical module according to a first embodiment.
Figure 2:
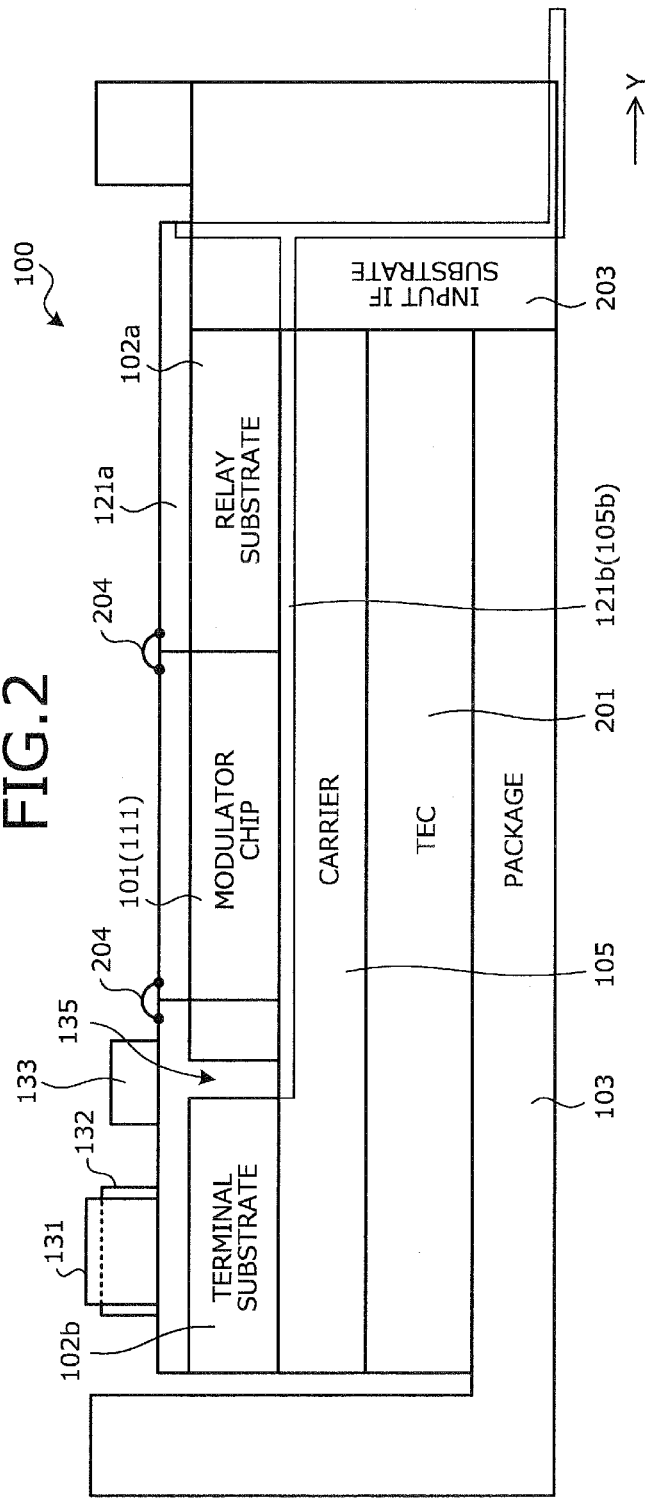
FIG. 2 is a side sectional view of the optical module according to the first embodiment.

FIG. 1 is a top view of an optical module according to a first embodiment, and FIG. 2 is a side sectional view of the optical module according to the first embodiment. This optical module 100 is an example of a configuration of a QPSK optical modulator, and includes a Mach-Zehnder modulator unit (modulator chip) 101, an electrode substrate 102, an enclosure (package) 103 housing the Mach-Zehnder modulator unit 101 and electrode substrate 102, input/output optical fibers 104 (104a and 104b), and a carrier (substrate) 105. Multiple terminals (RF terminals and DC terminals, which will be described later) are formed on the electrode substrate 102.

On the carrier 105 in the enclosure 103, a waveguide substrate 111 of the Mach-Zehnder modulator unit (modulator chip) 101 is disposed. On the carrier 105, a relay substrate 102a is mounted on one side and a terminal substrate 102b is mounted on the other side across the waveguide substrate 111.

The Mach-Zehnder modulator unit 101 includes electrodes 121 and an optical waveguide 112 formed on the waveguide substrate 111 made of an electrooptical crystal substrate, such as a $LiNbO_3$ (LN) substrate and a $LiTaO_2$ substrate or a semiconductor substrate, such as a GaAs substrate and an InP substrate.

The optical waveguide 112 includes an incoming waveguide 112a formed closer to an optical fiber 104a, parallel waveguides 112b (Mach-Zehnder interference units A and B) formed along the electrodes 121, and an output waveguide 112c.

Incoming light from the optical fiber 104a is branched by a branching unit 113 of the incoming waveguide 112a into branched beams of light incident on a pair of Mach-Zehnder interference units A and B (parallel waveguides 112A and 112B).

Each of the pair of Mach-Zehnder interference units A and B (parallel waveguides 112A and 112B) is branched into a pair of parallel waveguides 112b. The electrodes 121 are disposed parallel to the parallel waveguides 112b so that data on the electrodes 121 is transformed into data on an optical signal through a modulation process. The outgoing waveguide 112c downstream to the parallel waveguides 112b is equipped with a multiplexing unit 115, which multiplexes (by optical-polarization division) modulated components of the optical signal from the pair of Mach-Zehnder interference units A and B and outputs the multiplexed signal to the optical fiber 104b.

An optical coupler may be used as the branching unit 113 and the multiplexing unit 115. The optical waveguide 112 on the end of the waveguide substrate 111 spatially propagates light through optical elements, such as lenses (not depicted), and is optically connected to the input-side optical fiber 104a and the output-side optical fiber 104b.

The electrodes 121 are formed as electrodes along the Mach-Zehnder interference units A and B (parallel waveguides 112A and 112B) of the optical waveguide 112. On both ends of the electrodes 121 corresponding to the Mach-Zehnder interference units A and B (parallel waveguides 112A and 112B), grounding electrodes (not depicted) are formed as coplanar electrodes.

In the example depicted in FIG. 1, one Mach-Zehnder interference unit A has two parallel waveguides 112A, along which two electrodes 121 are disposed. Therefore, corresponding to the pair of Mach-Zehnder interference units A and B, four electrodes 121 are disposed in total along pairs of parallel waveguides 112A and 112B. In the example depicted in FIG. 1, one Mach-Zehnder interference unit A and a pair of electrodes 121 form one set while the other Mach-Zehnder interference unit B and another pair of electrodes 121 form another set, and therefore two sets of the Mach-Zehnder interference unit and electrodes are formed. The electrodes 121 along the Mach-Zehnder interference units A and B have the same length (working length) L1 and are arranged parallel to each other.

The electrode substrate 102 depicted in FIG. 1 is formed by two substrates, i.e., the relay substrate 102a and the terminal substrate 102b that are disposed across the waveguide substrate 111 of the Mach-Zehnder modulator unit 101.

The relay substrate 102a is provided to lead the ends of the electrodes 121 to the enclosure (package) 103. The electrodes 121 include four RF electrodes 121a, four bias (first) DC electrodes 121b, four phase-adjusting (second) DC electrodes 121c, and two phase-adjusting (third) DC electrodes 121d.

Among these four RF electrodes 121a and four DC electrodes 121b, two RF electrodes 121a and two (bias) DC electrodes 121b are allocated to the one Mach-Zehnder interference unit A (pair of parallel waveguides 112A).

The connection configuration of the electrodes 121 will be described sequentially from the input side. Ends of the RF electrodes 121a are connected to RF terminals of the enclosure 103. Transmission data in the form of a high-speed electronic signal (microwave signal) is input to the RF terminals. To a pair of RF electrodes 121a corresponding to the one Mach-Zehnder interference unit A configured by a pair of parallel waveguides, given transmission data is input. To a pair of RF electrodes 121a corresponding to the other Mach-Zehnder interference unit B configured by another pair of parallel waveguides, other data is input separately.

The RF electrodes 121a are connected through the relay substrate 102a to the Mach-Zehnder modulator unit 101, on which an electronic signal is converted (modulated) into an optical signal through the part of optical waveguide 112 that serves as the Mach-Zehnder interference units A and B (parallel waveguides 112A and 112B).

The RF electrodes 121a extending from the Mach-Zehnder modulator unit 101 are connected to the terminal substrate 102b (first interconnect unit). On the terminal substrate 102b, each electrode 121 is branched into two (second interconnect units).

Among the second interconnect units, one of the electrode 121 branches (first interconnect branch 121Aaa) is connected to a terminal resistor (50Ω) 132 via a capacitor 131 and is terminated by the terminal resistor 132.

The other of the electrode 121 branches (second interconnect branch 121Aab) is connected to the DC electrode 121b via a bias resistor 133 with a high resistance value (several hundreds Ω to several kΩ). This DC electrode 121b is connected a DC terminal of the enclosure 103 via the terminal substrate 102b, carrier 105, and relay substrate 102a. By applying a given voltage to this DC terminal and varying the applied voltage, a bias point of the Mach-Zehnder modulator unit 101 can be controlled.

On the rear part of the four parallel waveguides 112b making up the pair of Mach-Zehnder interference units A and B (two pairs of parallel waveguides 112A and 112B), the phase-adjusting DC electrodes 121c are disposed parallel to the four waveguides 112b and are lead to the relay substrate 102a. By applying voltage to the phase-adjusting DC electrodes 121c, an off-point (operating point) of the Mach-Zehnder modulator unit 101 (Mach-Zehnder interference units A and B) can be phase-controlled.

In this manner, because the phase-adjusting DC electrodes 121c are provided as electrodes independent of the above RF electrodes 121a, the off-point (operating point) of the Mach-Zehnder modulator unit (modulator chip) 101 can be adjusted. In addition, a bias T (device for applying a phase-adjusting voltage without affecting an RF signal) externally connected to the RF electrodes 121a can be omitted.

Parallel to the parallel waveguides 112b (two pairs of parallel waveguides, i.e., four parallel waveguides making up the Mach-Zehnder interference units A and B), four off-point adjusting DC electrodes 121c are disposed and are lead to the relay substrate 102a. On the outgoing waveguide 112c, the phase-adjusting (third) DC electrodes 121d are disposed parallel to two waveguides, and are lead to the relay substrate 102a. By applying a voltage to the phase-adjusting DC electrodes 121c, the off-point (operating point) of the Mach-Zehnder modulator unit 101 (Mach-Zehnder interference units A and B) can be phase-controlled. By applying a voltage to the phase-adjusting DC electrodes 121d, the phases of the pair of waveguides of the outgoing waveguide 112c can be controlled so that the phases are set to be orthogonal to each other.

The wiring layout of the multiple electrodes 121 on the terminal substrate 102b depicted in FIG. 1 will be described. Two electrodes 121A (first group configured by electrodes 121Aa and 121Ab) making up one Mach-Zehnder interference unit A are bent on the terminal substrate 102b, into an L shape in a first direction (X1 direction in FIG. 1) along the direction of travel of an optical signal.

The branching and arrangement of one electrode 121Aa will be described along a signal path. The capacitor 131 and the terminal resistor (50Ω) 132 on one electrode 121Aaa branching from the electrode 121Aa are arranged in the X1 direction. The bias resistor 133 on the other electrode 121Aab branching from the electrode 121Aa is disposed in the same X1 direction in which the capacitor 131 and the terminal resistor (50Ω) 132 are arranged. To the capacitor 131 and the terminal resistor 132, the bias resistor 133 is disposed parallel along the width (Y) direction of the enclosure 103. The capacitor 131, the terminal resistor 132, and the bias resistor 133 making up the other electrode 121Aab are also arranged in the X1 direction and in the Y direction in the same manner as in the case of the electrode 121 Aa.

Meanwhile, two electrodes 121B (second group configured by electrodes 121Ba and 121Bb) making up the other Mach-Zehnder interference unit B are bent into an L shape in a second direction (X2 direction in FIG. 1) opposite to the direction of bending (X1) of the electrodes 121A (first group). The capacitor 131, the terminal resistor 132, and the bias resistor 133 making up the electrodes 121Ba and 121Bb are also arranged in the X2 direction.

In this manner, on the terminal substrate 102b, wiring patterns of multiple (four) electrodes 121 are divided into two groups, i.e., a group of the electrodes 121A and a group of the electrodes 121B. The wiring pattern of one group of the electrodes 121A (first group configured by the electrodes 121Aa and 121Ab) and the wiring pattern of the other group of the electrodes 121B (second group configured by the electrodes 121Ba and 121Bb) are arranged in directions (X1 and X2 directions) opposite to each other along the length direction (X axis).

In the example depicted in FIG. 1, in a view along the length direction (X-axis), the one group of the electrodes 121A (first group) are arranged at a position at which the electrodes 121A overlap the working length L1 of the Mach-Zehnder interference units A and B. In this electrode layout as described above, arrangement of the bias resistors 133 requiring a given area in the directions opposite to each other on respective divided groups of electrodes is important. Because the bias resistors 133 have high resistance values (several hundreds Ω to several kΩ), a given area must be established for the bias resistors 133 on the terminal substrate 102b. For this reason, the bias resistors 133 are arranged in distributed areas.

In this manner, by dividing the wiring patterns of four electrodes 121 into two groups along the length directions (X1 and X2) of the enclosure 103 in distributed arrangement, an increase in the size of the terminal substrate 102b (along the X-axis direction) can be suppressed. The length L2 of the terminal substrate 102b, therefore, can be reduced. Hence, the length of the enclosure 103 housing the terminal substrate 102b can be reduced, thereby reducing the size of the enclosure 103.

As depicted in FIG. 2, in the optical module 100, a thermoelectric cooler (TEC) 201 and the carrier 105 are mounted in ascending order from the inner bottom face of the enclosure (package) 103.

On the carrier 105, the waveguide substrate 111 of the Mach-Zehnder modulator unit 101 is mounted. On the carrier 105, the relay substrate 102a is mounted on one side and the terminal substrate 102b is mounted on the other side across the waveguide substrate 111 of the Mach-Zehnder modulator unit 101.

On the surfaces of the relay substrate 102a, the waveguide substrate 111 of the Mach-Zehnder modulator unit 101, and the terminal substrate 102b, the RF electrodes 121 (121a) are extended at the same level with an electrical connection between the relay substrate 102a and the waveguide substrate 111 and an electrical connection between waveguide substrate 111 and the terminal substrate 102b being formed by wire bonding 204, etc.

The thermoelectric cooler 201 includes a temperature adjusting member, such as a heat sink and Peltier element, a temperature detecting element, and a control circuit, and controls temperature so that the carrier 105, the relay substrate 102, the terminal substrate 102b, and the waveguide substrate 111 of the Mach-Zehnder modulator unit 101 mounted on the upper surface of the optical module have a constant temperature.

The electrodes 121 (RF electrodes 121a and DC electrodes 121b) of the relay substrate 102a are lead to external terminals (not depicted) of the enclosure 103 via an input IF substrate 203.

A route leading the bias DC electrodes 121b from the terminal substrate 102b to the DC terminals will be described. On the terminal substrate 102b, the DC electrodes 121b are lead from the other ends of the bias resistors 133 to the surface of the carrier 105 via the ends (side faces) of the terminal substrate 102b. The DC electrodes 121b are then extended as electrodes 105b on the surface of the carrier 105 and are caused to pass under the Mach-Zehnder modulator unit (modulator chip) 101 (back surface opposite to the surface of the modulator chip 101) and the relay substrate 102a. The DC electrodes 121b are then led out of the optical module via the DC terminals (more specifically, via the IF input substrate 203 depicted in FIG. 2).

In this manner, the DC electrodes 121b do not pass over the surface of the Mach-Zehnder modulator unit (modulator chip) 101 but rather pass along the carrier 105, disposed under (back surface of) the Mach-Zehnder modulator unit (modulator chip) 101 and are lead to the DC terminals.

It is therefore unnecessary to form the DC electrodes 121b on the surfaces of the Mach-Zehnder modulator unit (modulator chip) 101 and relay substrate 102a, thereby eliminating a need to create space for the DC electrodes 121b to pass therethrough on the Mach-Zehnder modulator unit (modulator chip) 101. Consequently, a reduction along the length L2 along the X-axis direction of the Mach-Zehnder modulator unit (modulator chip) 101 is achieved. No need of forming the DC electrodes 121b also makes wire bonded connections, etc., unnecessary for causing the DC electrodes 121b to pass along the Mach-Zehnder modulator unit (modulator chip) 101, thereby saving trouble in the manufacturing process.

Because the electrodes 105b formed on the surface of the carrier 105 are used as the DC electrodes 121b, no layout restriction is imposed for establishing an area to arrange the DC electrodes 121b on the Mach-Zehnder modulator unit (modulator chip) 101. The electrodes 105b on the surface of the carrier 105 can be laid out freely with any given wiring pattern without restriction.

In the example depicted in FIG. 1, the electrodes 105b (DC electrodes 121b) on the surface of the carrier 105 are laid out into a bent shape so that the position of the DC terminals for the DC electrodes 121b is separated from the position of the RF terminals for the RF electrodes 121a. In the example depicted in FIG. 1, the (group of) RF terminals for the four RF electrodes 121a are arranged collectively in one location. The (group of) DC terminals for the four bias DC electrodes 121b (and for the four phase-adjusting DC electrodes 121c and two phase-adjusting DC electrodes 121d) are arranged collectively in one location separated from the location of the RF terminals.

The four phase-adjusting DC electrodes 121c and two phase-adjusting DC electrodes 121d are formed on the surface of the Mach-Zehnder modulator unit (modulator chip) 101 and extend over the relay substrate 120a through wire bonding, etc., to reach the DC terminals.

The RF terminals have to be provided using a large connector, such as coaxial connector, so that the prescribed pitch of the RF terminals is ensured to reduce crosstalk. The DC terminals, on the other hand, can be provided by using a small connector, enabling the pitch of the DC terminals to be narrow. As described above, arrangement of the DC electrodes 121b can be performed freely. This allows the pitch of the RF terminals and of the DC terminals to be adjusted easily.

According to the first embodiment, therefore, the length L2 along the X-axis direction of the Mach-Zehnder modulator unit (modulator chip) 101 can be reduced, which allows a reduction in the size and cost of the optical module. This size reduction leads to a reduction in the loss of the Mach-Zehnder modulator unit (modulator chip) 101, to an increase in the number of the waveguide substrates 111 produced from a single mold, and to improvement in the yield of the Mach-Zehnder modulator unit (modulator chip) 101.

Figure 3:
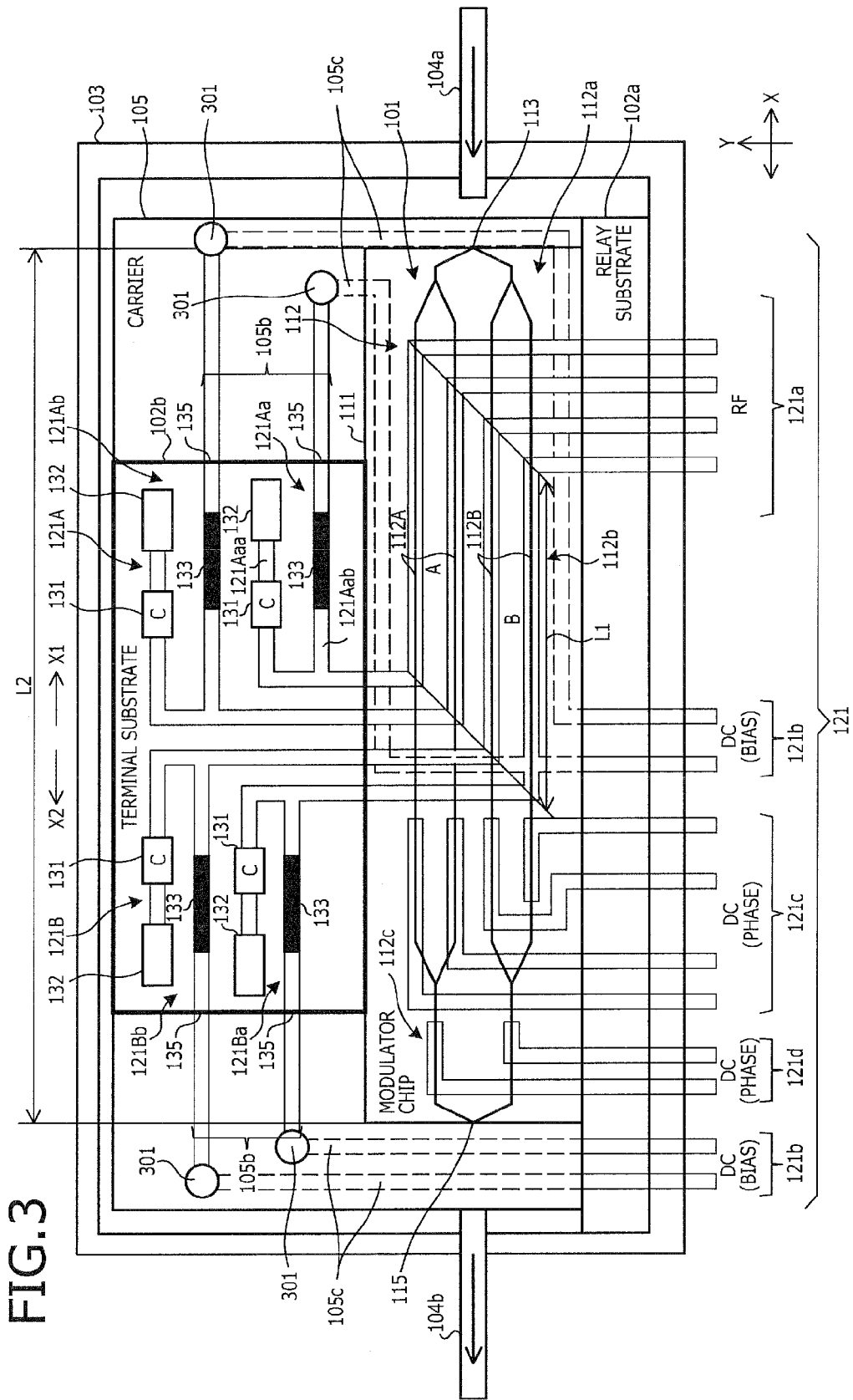
FIG. 3 is a top view of the optical module according to a second embodiment.
Figure 4:
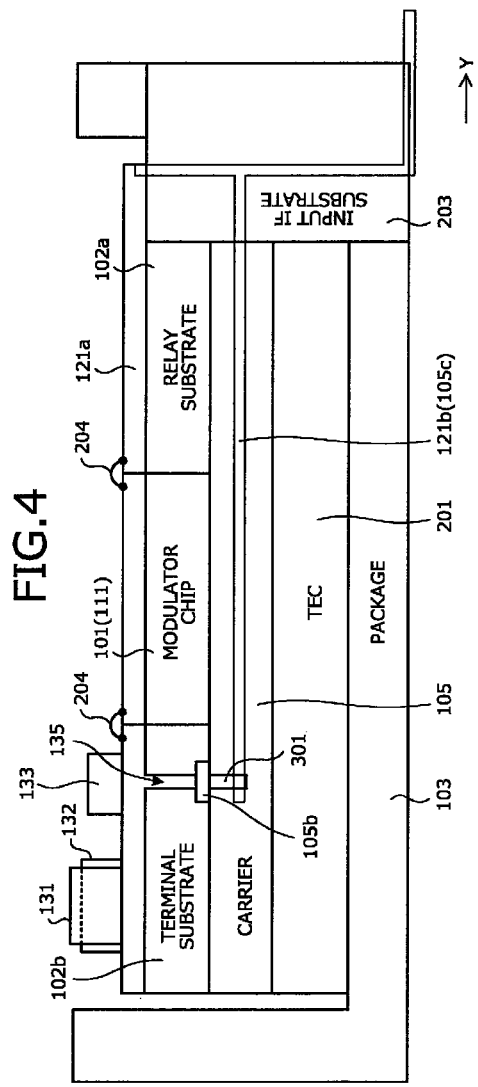
FIG. 4 is a side sectional view of the optical module according to the second embodiment.

FIG. 3 is a top view of the optical module according to a second embodiment, and FIG. 4 is a side sectional view of the optical module according to the second embodiment. In the second embodiment, component units identical to those described in the first embodiment are denoted by the same reference numerals used in the first embodiment. The second embodiment differs from the first embodiment in a method of leading the bias DC electrodes 121b (interconnect arrangement).

The method of leading the bias DC electrodes 121b is described for the electrodes 121Aa of the one Mach-Zehnder interference unit A. On the terminal substrate 102b, the DC electrodes 121b extend from the other ends of bias resistors 133 and are connected to the electrodes 105b on the surface of the carrier 105 via the end (side face) 135 of the terminal substrate 102b.

The carrier 105 is configured by a laminated substrate, on which the surface electrodes 105b are connected to inner layer interconnects 105c (indicated by dotted lines in FIG. 3) through vias 301. These inner layer interconnects 105c pass under the Mach-Zehnder modulator unit (modulator chip) 101 and the relay substrate 102a, are connected to the DC terminals (more specifically, the input IF substrate 203 depicted in FIG. 4), and are lead out of the optical module.

According to the above configuration, it is unnecessary to establish space for the DC electrodes 121b to pass therethrough on the surfaces of the Mach-Zehnder modulator unit (modulator chip) 101. The Mach-Zehnder modulator unit (modulator chip) 101, therefore, is not under layout restrictions for establishing an area to arrange the DC electrodes 121b and therefore, can be reduced in length L2 along the X-axis direction. Wire bonded connections, etc., to extend the DC electrodes 121b on the Mach-Zehnder modulator unit (modulator chip) 101 also become unnecessary, thereby saving trouble in the manufacturing process.

Freedom in layout the DC electrodes 121b enables collective arrangement of the four bias DC electrodes 121b and the phase-adjusting DC electrodes 121c and 121d at one location. The DC electrodes 121b, 121c, and 121d arranged collectively at one location can be separated from the RF terminals arranged collectively at another location.

According to the second embodiment, the DC electrodes 121b pass under the Mach-Zehnder modulator unit 101 and are lead out of the optical module, using the inner layer interconnects 105c of the carrier 105. Therefore, even in a configuration in which the back surface of the Mach-Zehnder modulator unit (modulator chip) 101 is metalized as a ground electrode, the DC electrodes 121b can be lead out without short-circuiting at the Mach-Zehnder modulator unit 101.

Figure 5:
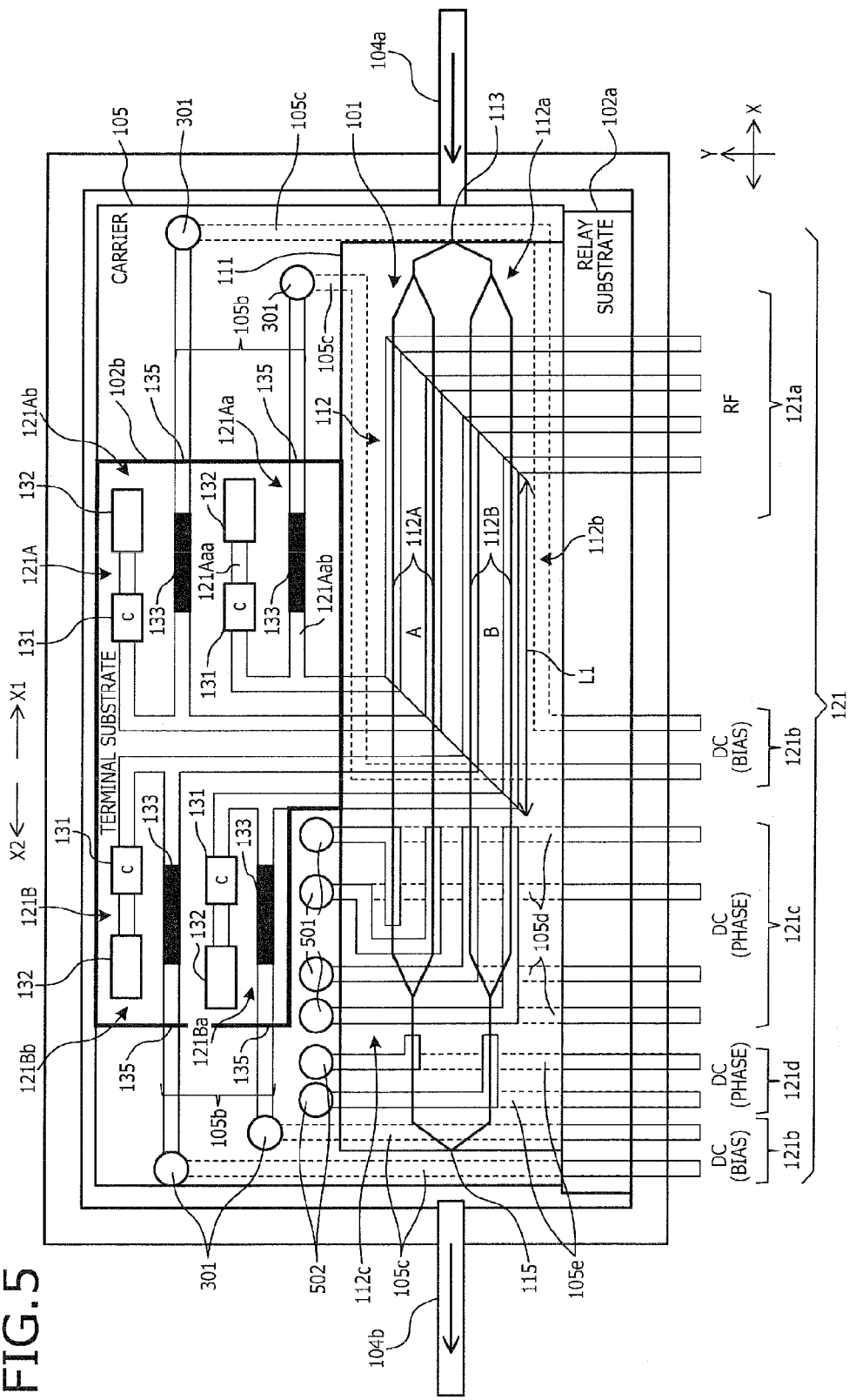
FIG. 5 is a top view of the optical module according to a third embodiment.

FIG. 5 is a top view of the optical module according to a third embodiment. The third embodiment differs from the second embodiment in a method of leading the bias DC electrodes 121b (interconnect arrangement). In the second embodiment, the inner layer interconnects of the carrier 105 are used for the (bias) DC electrodes 121b among the DC electrodes. In the third embodiment, however, the inner layer interconnects of the carrier 105 are used for all the DC electrodes 121b, 121c, and 121d.

As depicted in FIG. 5, in the same manner as in the second embodiment, the bias DC electrodes 121b are connected sequentially to the other ends of the bias resistors 133, the ends (side faces) 135 of the terminal substrate 102b, the electrodes 105b on the surface of the carrier 105, the vias 301, the inner layer interconnects 105c, and the DC terminals, and are lead out of the optical module.

The phase (off-point)-adjusting DC electrodes 121c are lead from the four waveguides of the pair of Mach-Zehnder interference units A and B (parallel waveguides 112A and 112B) to vias 501 of the carrier 105. The phase-adjusting DC electrodes are then lead from the vias 501 of the carrier 105 to the DC terminals via inner layer interconnects 105d of the carrier 105.

In a similar manner, the phase (orthogonal)-adjusting DC electrodes 121d are lead from two waveguides making up the outgoing waveguide 112c, to vias 502 of the carrier 105. The phase-adjusting DC electrodes are then lead from the vias 502 of the carrier 105 to the DC terminals via inner layer interconnects 105e of the carrier 105.

According to the third embodiment, all the DC electrodes 121b, 121c, and 121d are lead to the DC terminals, using the inner layer interconnects 105c, 105d, and 105e of the carrier 105. In this manner, the DC electrodes other than the RF electrodes 121a can be laid out freely in wiring arrangement, using the inner layer interconnects 105c, 105d, and 105e.

Freedom in the layout of the DC electrodes 121b enables collective arrangement of the four bias DC electrodes 121b and the phase-adjusting DC electrodes 121c and 121d at one location. The DC electrodes 121b, 121c, and 121d arranged collectively at one location can be separated from the RF terminals arranged collectively at another location.

Figure 6:
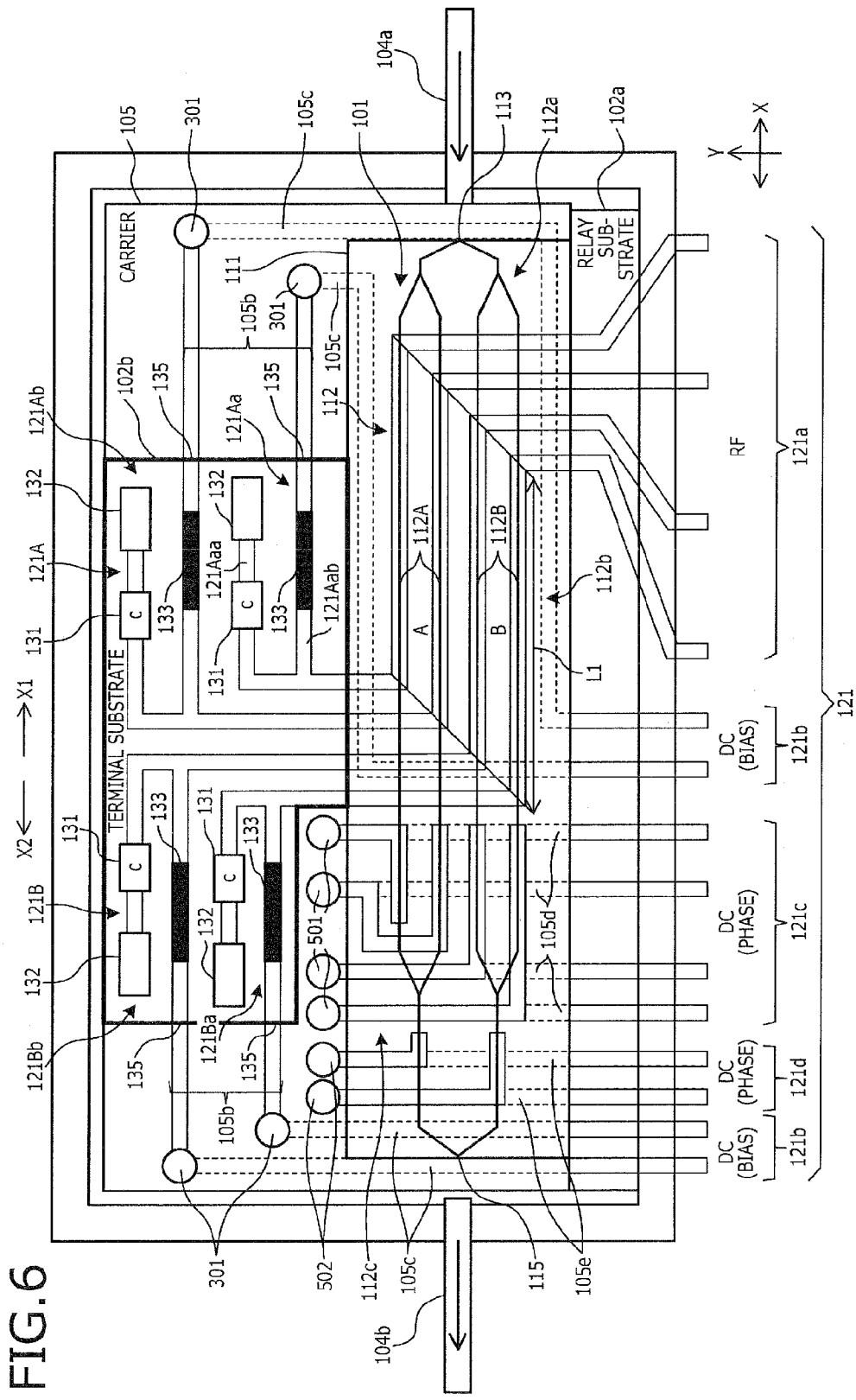
FIG. 6 is a top view of another optical module of the third embodiment.

FIG. 6 is a top view of another optical module of the third embodiment. The optical module of FIG. 6 differs from the optical module of FIG. 5 in that the pitch of the RF electrodes 121a is widened. In this manner, because the DC electrodes 121b, 121c, and 121d can be laid out to be grouped together at one location, the arrangement space for the RF electrodes 121a can be broadened. As a result, as depicted in FIG. 6, the pitch of the RF electrodes 121a can be widened. Hence, the RF terminals using a large connector can be arranged with extra room.

Figure 7:
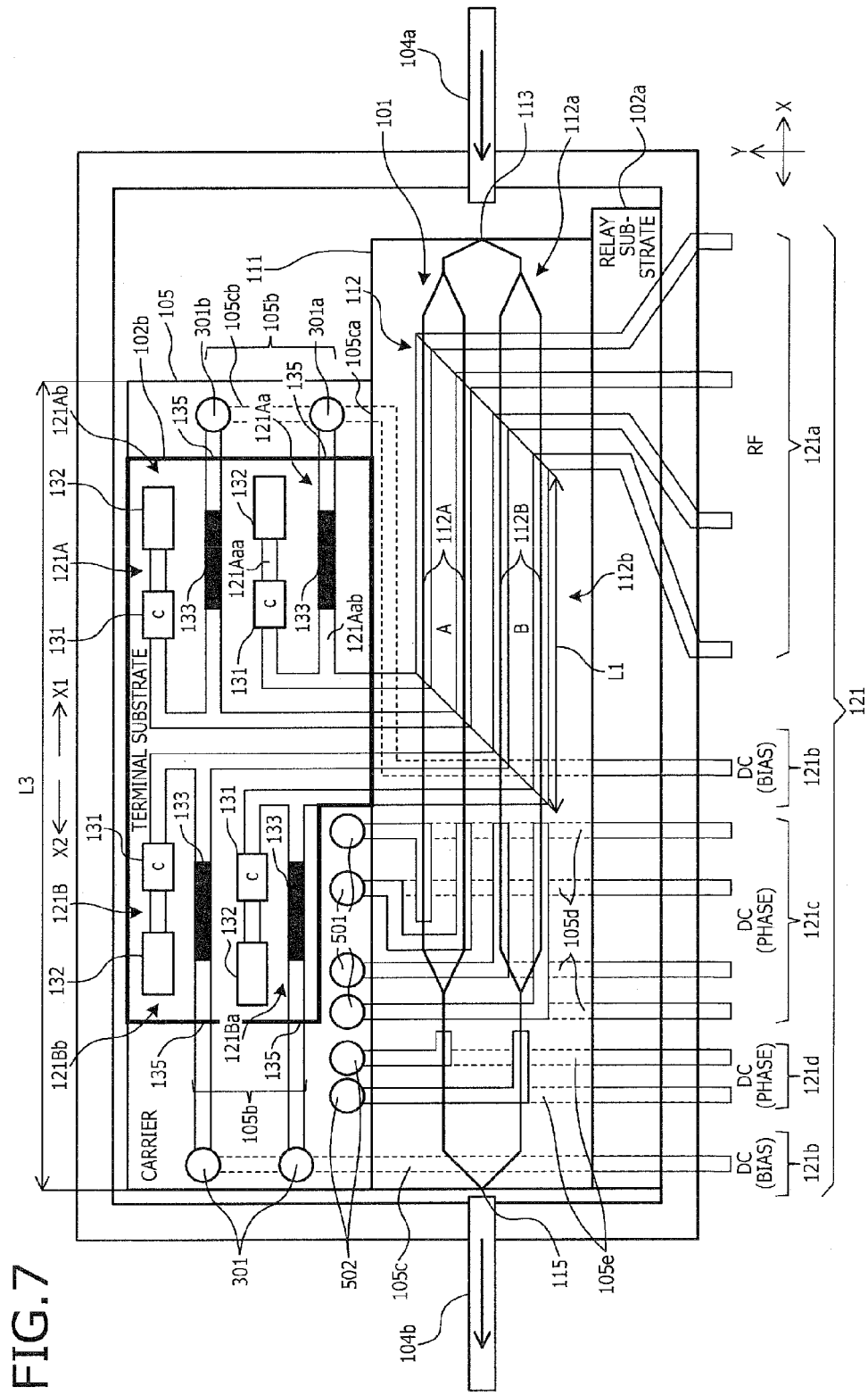
FIG. 7 is a top view of the optical module according to a fourth embodiment.
Figure 8:
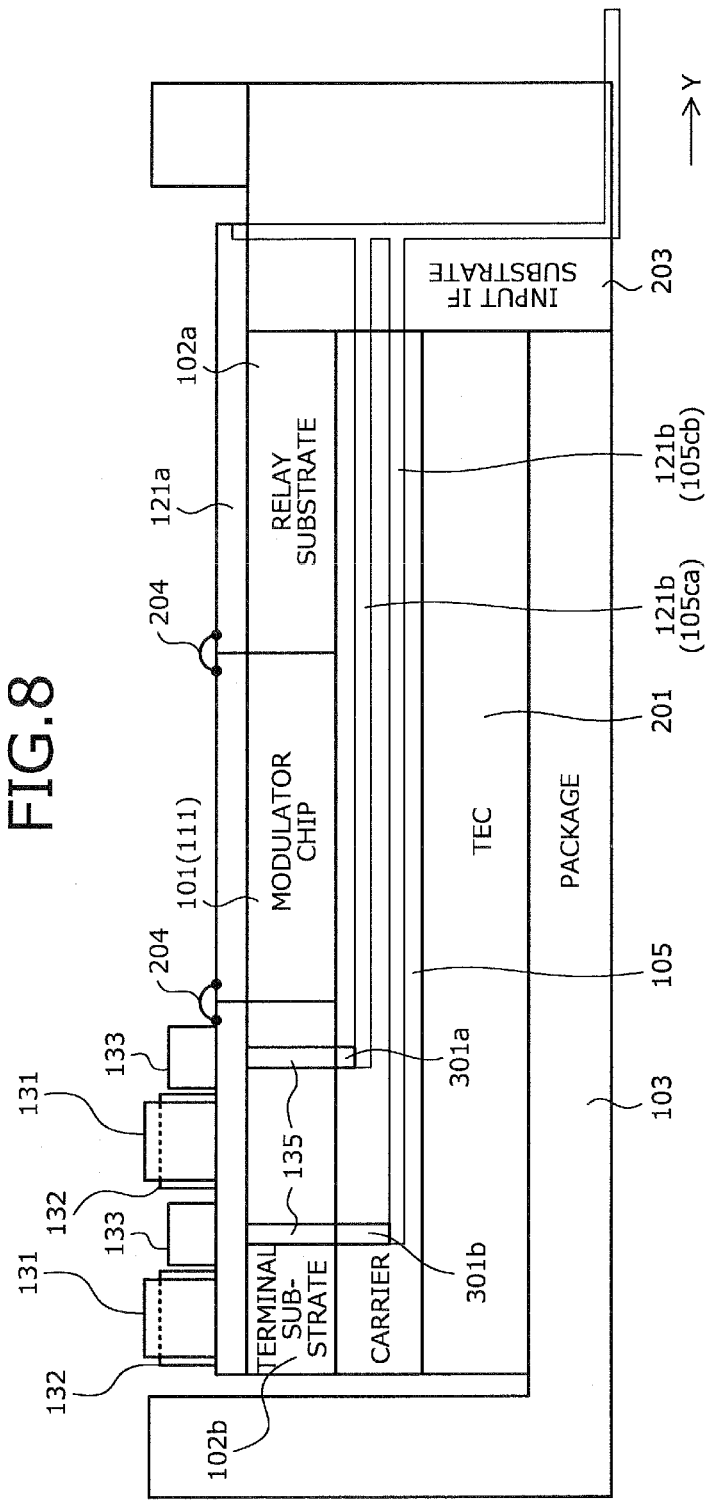
FIG. 8 is a side sectional view of the optical module according to the fourth embodiment.

FIG. 7 is a top view of the optical module according to a fourth embodiment, and FIG. 8 is a side sectional view of the optical module according to the fourth embodiment. According to the fourth embodiment, the multiple bias DC electrodes 121b are lead out, using inner layer interconnects of different layers of the carrier 105 formed of the laminated substrate.

An example of two electrodes 121A (first group) of the one Mach-Zehnder interference unit A will be described. The vias 301 (301a and 301b) of the two DC electrodes 121b are arranged at the same position in a view along the length (X-axis) direction but at different positions in a view along the width (Y-axis) direction.

As depicted in FIG. 8, the vias 301a are connected to inner layer interconnects 105ca of the carrier 105, while the vias 301b are connected to inner layer interconnects 105cb of a layer different from a layer on which the inner layer interconnects 105ca of the carrier 105 are formed, and are lead to the DC terminals. As depicted in FIG. 7, the inner layer interconnects 105ca and 105cb are formed at the same position in a view along the length (X-axis) direction but at different positions in a view along the height (thickness) direction of the carrier 105.

Two electrodes 121B (second group) of the other Mach-Zehnder interference unit B are also lead to the DC terminals using inner layer interconnects of layers formed at the same position in a view along the length (X-axis) direction of the carrier 105 but at different positions in a view along the height (thickness) direction of the carrier 105, in the same manner as in the case of the first group.

According to the fourth embodiment, for the carrier 105, a space along the length (X-axis) direction necessary for leading (arranging) the bias DC electrodes 121b can be reduced. As a result, the length L3 of the carrier 105 can be reduced to be shorter than the length L3 of the first to third embodiments.

Figure 9:
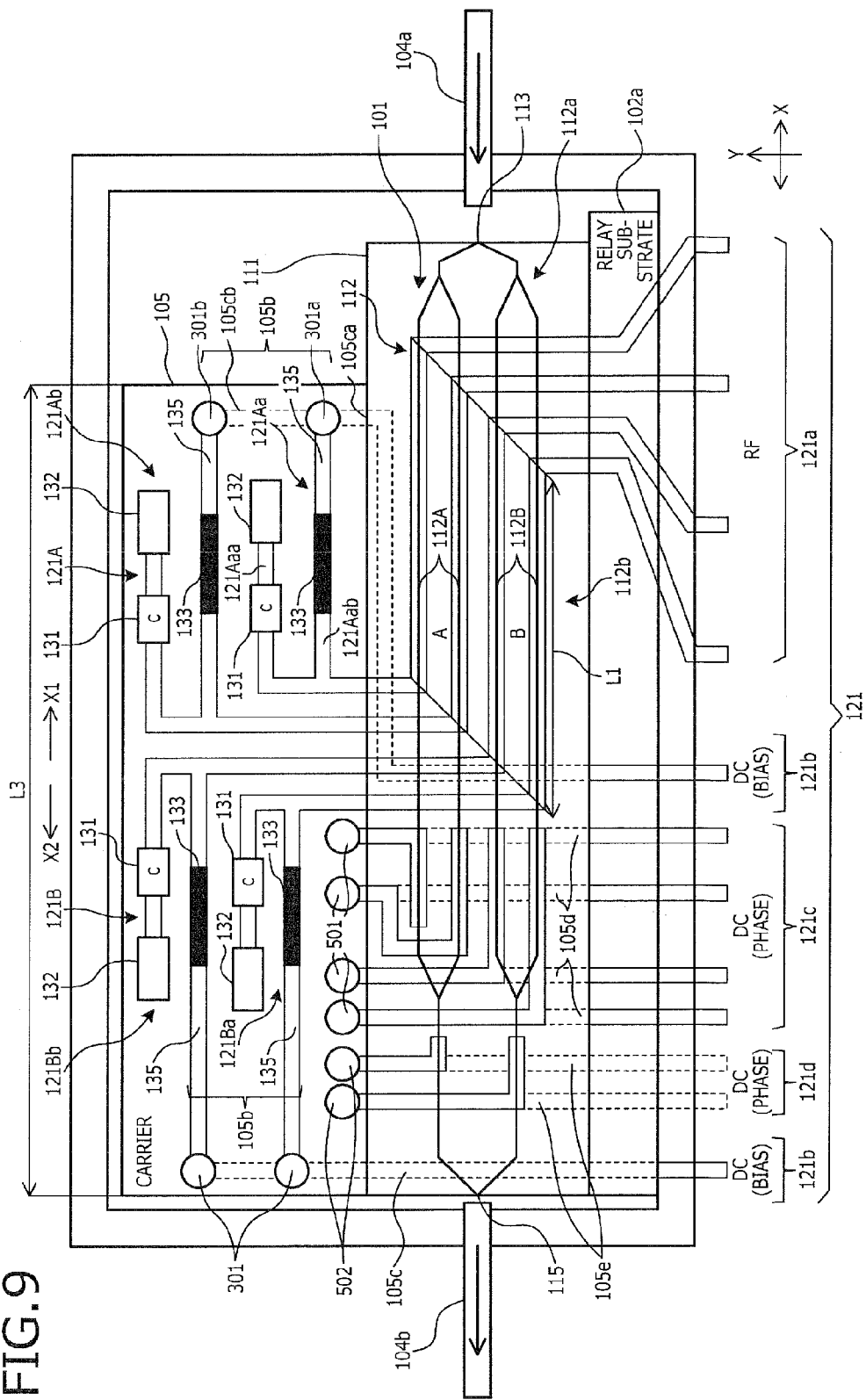
FIG. 9 is a top view of the optical module according to a fifth embodiment.
Figure 10:
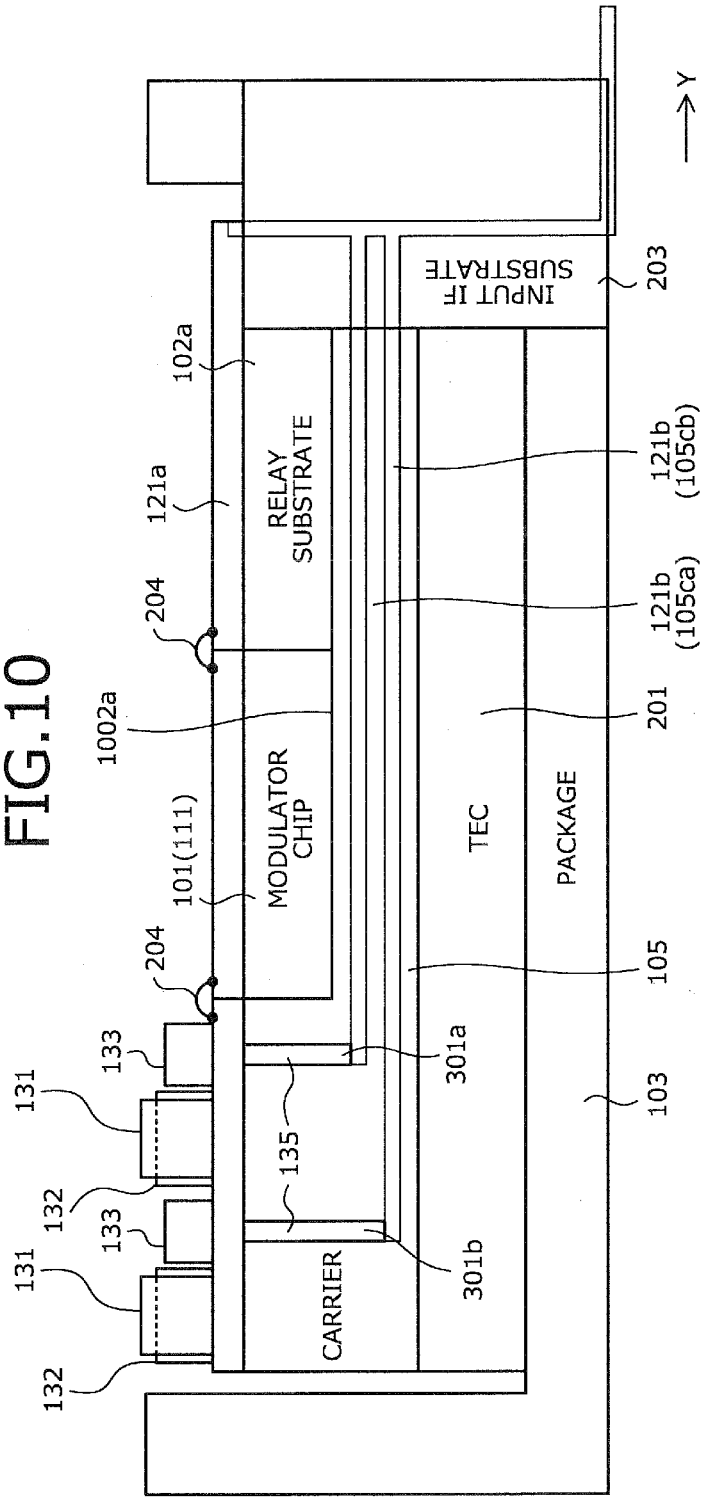
FIG. 10 is a side sectional view of the optical module according to the fifth embodiment.

FIG. 9 is a top view of the optical module according to a fifth embodiment, and FIG. 10 is a side sectional view of the optical module according to the fifth embodiment. The fifth embodiment is a modification of the fourth embodiment and relates to a configuration in which the terminal substrate 102b described in the fourth embodiment and the carrier 105 are integrated. Aside from this aspect, the fifth embodiment is the same as the fourth embodiment, achieving a configuration in which the multiple bias DC electrodes 121b are lead out, using inner layer interconnects of different layers of the carrier 105 formed by the laminated substrate.

As depicted in FIG. 10, a recess (groove) 1002a as deep as the height of the relay substrate 102a and the waveguide substrate 111 of the Mach-Zehnder modulator unit (modulator chip) 101 is formed on the surface of the carrier 105, and the relay substrate 102a and the waveguide substrate 111 of the Mach-Zehnder modulator unit (modulator chip) 101 are placed in the recess 1002a. As a result, the surface (electrode position) of the waveguide substrate 111 placed in the recess (groove) 1002a and the surface (electrode position) of the carrier 105 placed in the recess (groove) 1002a can be set to be flush with each other.

According to the fifth embodiment, because the terminal substrate and the carrier 105 are integrated together, the number of components is reduced, packaging precision is improved, and easier management is achieved. Improved packaging precision leads to improved modulation characteristics.

Figure 11:
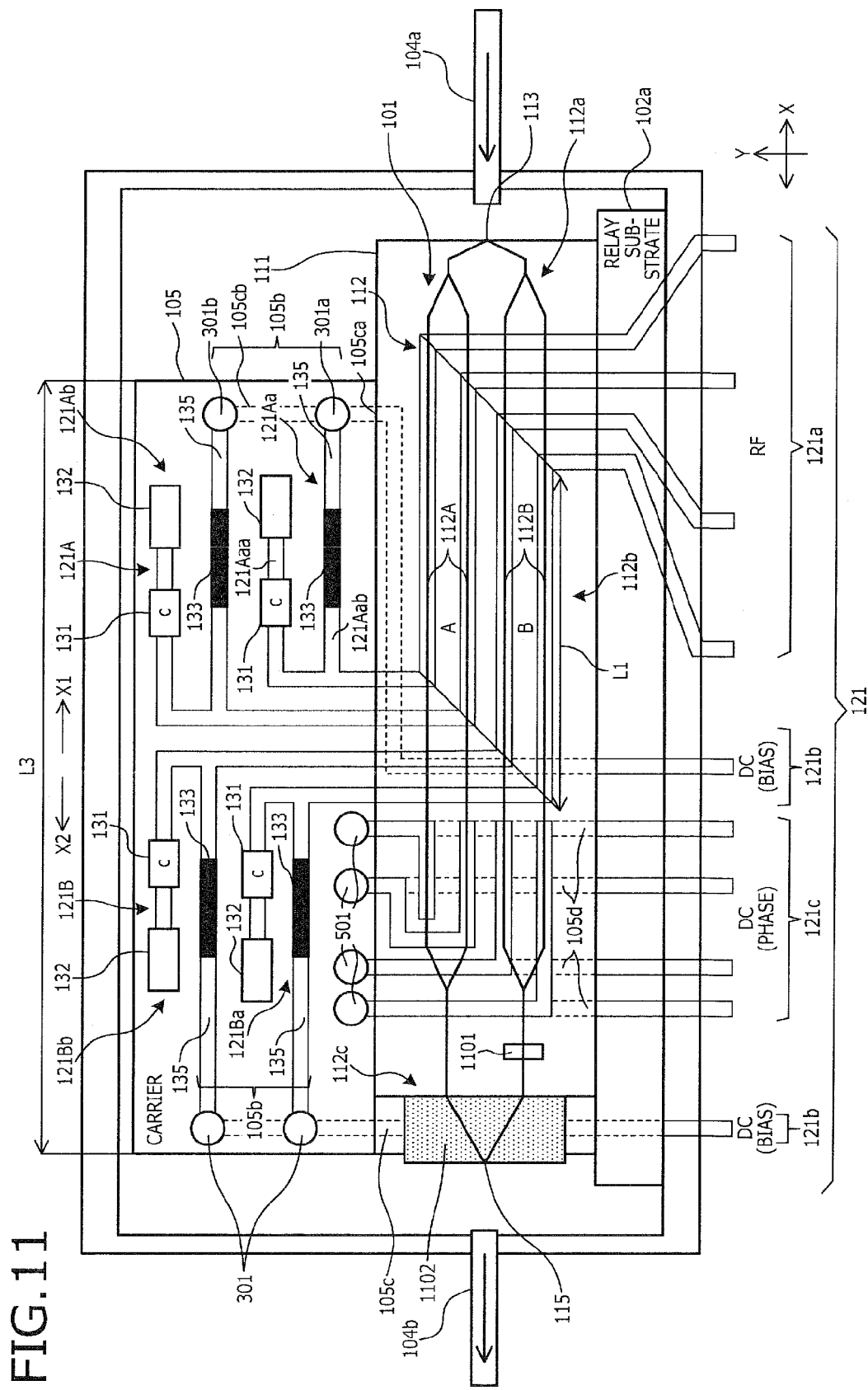
FIG. 11 is a top view of the optical module according to a sixth embodiment.

FIG. 11 is a top view of the optical module according to a sixth embodiment. This optical module 100 of the sixth embodiment is a configuration example of a DP-DPSK optical modulator different from the QPSK modulator of the first to fifth embodiment. According to the sixth embodiment, one waveguide making up the outgoing waveguide 112c is equipped with a polarization rotating unit 1101 that rotates the direction of polarization to set the polarization to be perpendicular to the direction of polarization by the other waveguide of the outgoing waveguide 112c. The multiplexing unit 115 is equipped with a polarized wave synthesizing unit 1102. In each of the first to sixth embodiments, the outgoing waveguide 112c may be selectively provided with the phase adjusting mechanism of the first to fifth embodiments or the polarization adjusting mechanism of the sixth embodiment for adoption of a selected modulation method.

Figure 12:
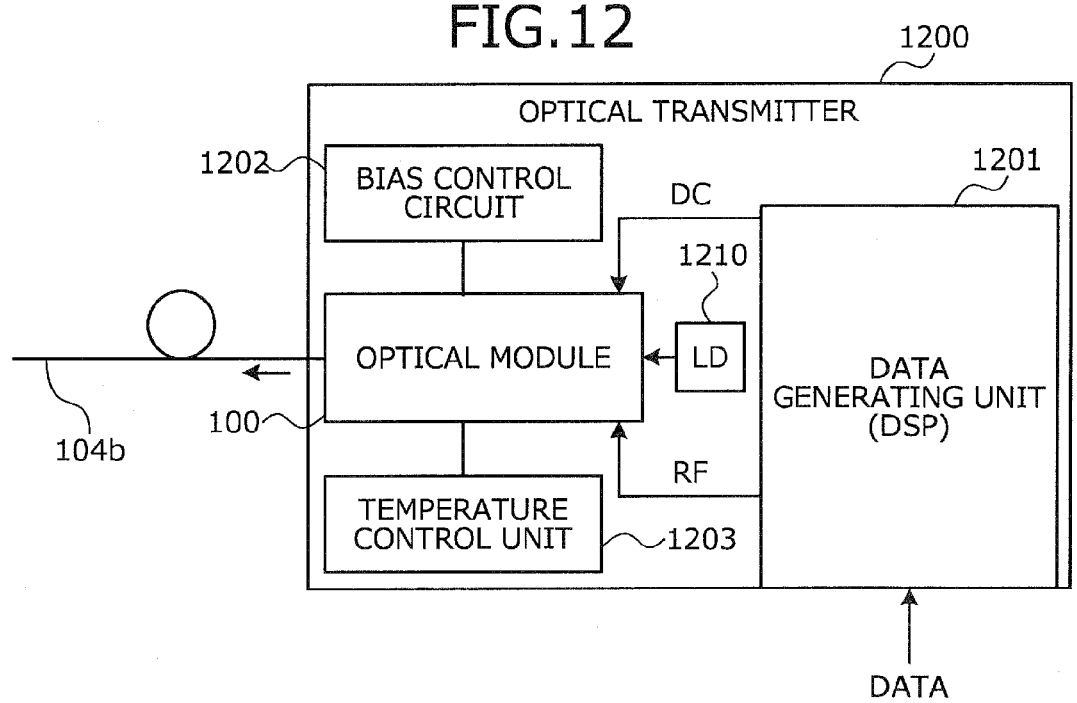
FIG. 12 is a block diagram of a configuration example of an optical transmitter according to a seventh embodiment.

FIG. 12 is a block diagram of a configuration example of an optical transmitter according to a seventh embodiment. An optical transmitter 1200 includes the optical module 100 of the above embodiments, a data generating unit 1201, and a laser diode (LD) light source 1210. The data generating unit 1201 may be configured by, for example, a digital signal processor (DSP). The data generating unit 1201 outputs incoming transmission/reception data (two separate data) in the form of a high-speed microwave signal (electronic signal), to the RF electrodes 121a of the optical module 100. The generating unit 1201 also controls the bias point of the Mach-Zehnder interference units A and B via the DC electrodes 121b of the optical module 100. In the configuration example of the QPSK modulator, the generating unit 1201 controls the off-point via the DC electrodes 121c and performs quadrature phase control via the DC electrodes 121d.

In the configuration example of the DP-DPSK modulator, a bias control circuit 1202 performs polarization control over the polarization rotating unit 1101 and the polarized wave synthesizing unit 1102 so that the direction of polarization of light at the pair of parallel waveguides 112A and the direction of polarization of light at the pair of parallel waveguides 112B become orthogonal to each other. A temperature control unit 1203 responds to environmental temperature change, etc., controlling the temperature adjusting cooler 301 so that the optical module 100 remains at a constant temperature.

Light from the LD light source 1210 is input to the optical module 100, which multiplexes two separate data through the pair of Mach-Zehnder interference units A and B by the above modulation method (QPSK, DP-DPSK, etc.) and outputs multiplexed signals from the optical fiber 104b.

In each of the second to fifth embodiments, when the configuration of using the inner layer interconnects of the carrier 105 for leading the DC electrodes 121b is adopted, the bias resistors 133 may be disposed on the inner layer interconnects. Since the bias resistors 133 have high resistance values (several hundreds Ω to several kΩ), sufficient space for disposing the bias resistors 133 is needed. If the bias resistors 133 of a given length are disposed on the inner layer interconnects 105c of the carrier 105, space for mounting the bias resistors 133 on the carrier 105 can be reduced. Hence, the size along the width (Y-axis) direction of the carrier 105 can be reduced by a portion equivalent to the bias resistors 133, which are not disposed on the carrier 105.

The terminal resistors 132 have small resistance values and are compact, thus taking less space. Disposing the capacitors 131 on the inner layer interconnects 105c of the carrier 105 is difficult.

The bias resistors 133 may be disposed on the back surface of the terminal substrate 102b or of the carrier 105. It is also possible to form vias on the terminal substrate 102b or the carrier 105 so that the bias resistors 133 can be disposed on the back surfaces of the terminal substrate 102b or the carrier 105. In these cases, the space for mounting the bias resistors 133 on the carrier 105 can be reduced.

In each of the first to fifth embodiments, the bias resistors 133 are arranged such that the bias resistors 133 are shifted along the Y-axis direction so as not to overlap the capacitors 131 and the terminal resistors 132. In contrast, if the bias resistors 133 are disposed on the inner layer interconnects or the back surface of the carrier 105 or of the terminal substrate 102b, the size of the mounting space on the surface of the carrier 105 or terminal substrate 102b can be reduced along the Y-axis direction by a portion equivalent to the bias resistors 133 (and DC electrodes 121Aab). Hence, the size along the width (Y-axis) direction of the carrier 105 can be reduced.

Even if the DC electrodes 121b are disposed on the carrier 105 or terminal substrate 102b, such a configuration does not affect the (RF) electrodes 121a for high-frequency signals and enables the high-frequency characteristics of a high-speed microwave signal to be maintained.

Figure 13:
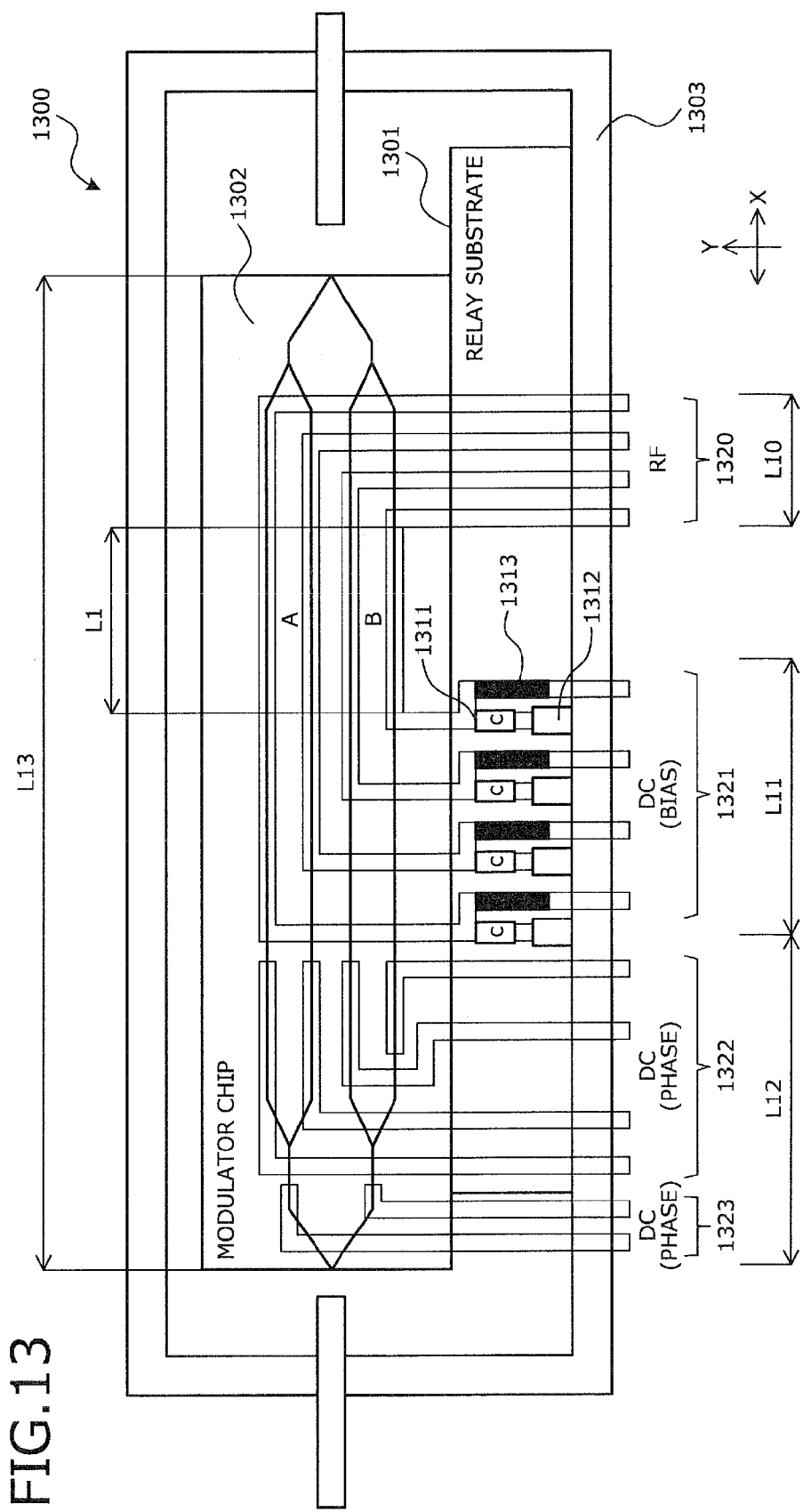
FIG. 13 is a top view of a configuration example of another optical module for comparison with the optical module of the embodiments.

FIG. 13 is a top view of a configuration example of another optical module for comparison with the optical module of the embodiments. FIG. 13 depicts a configuration example in which a pair of the Mach-Zehnder interference units A and B (working length L1) are disposed adjacent to each other on a modulator chip 1302 and the above electrode terminals and electronic components (capacitors 1311, terminal resistors 1312, bias resistors 1313) are arranged on a relay substrate 1301.

An optical modulator 1300 depicted in FIG. 13 has a configuration in which the electronic components (capacitors 1311, terminal resistors 1312, bias resistors 1313) on multiple electrodes are simply arranged in parallel along the X-axis direction. To enable this arrangement of the electronic components (capacitors 1311, terminal resistors 1312, bias resistors 1313), the bias DC electrodes 1321 have to be a length L11.

In this manner, when all electrodes are disposed on the surface of the modulator chip 1302, the length L13 of the modulator chip 1302 must be the total of the working length L1, the length L10 of RF electrodes 1320, the length L11 of DC electrodes 1321, and the length 12 of DC electrodes 1322 and 1323. The longitudinal size of the modulator chip 1302, therefore, is increased, which consequently increases the longitudinal size of an enclosure 1303.

In the configuration depicted in FIG. 13, the lengths of electrodes (working length L1) on the Mach-Zehnder interference units A and B differ from one another. It is therefore necessary in actual application to determine the lengths of multiple electrodes disposed parallel to each other on the optical waveguides to be identical and to dispose an electrode of the working length L1 or greater in a location deviated from the optical waveguide.

According to the optical module 100 of the above embodiments, as depicted in FIG. 1, etc., the DC electrodes 121b (and the DC electrodes 121c and 121d of FIGS. 5 and 7) do not pass over the surface of the modulator chip 101 (waveguide substrate 111) but rather pass under the modulator chip 101, using the interconnects on the carrier substrate 105. This eliminates the need of establishing space for the DC electrodes 121b to pass therethrough, thus enabling a reduction along the length of the modulator chip 101 by a portion equivalent to the length L11 of FIG. 13.

On the terminal substrate 102b, multiple electrodes 121 are distributed along the length (X-axis) direction (i.e., divided into two groups that are arranged opposite to each other). The electrodes 121 distributed along the length direction are located at the positions at which the electrodes 121 overlap the working length L1 required by the Mach-Zehnder interference units A and B along the length direction. As a result, on the terminal substrate 102b, the electrodes 121 necessary for arrangement of the electronic components to be mounted (capacitors 131, terminal resistors 132, bias resistors 133) can be shortened along the length direction.

If the inner layer interconnects of the carrier 105 are used for the other electrodes 121 Aab branching from the electrodes 121Aa and the bias resistors 133 are disposed on the inner layer interconnects, the arrangement space for the bias resistors 133 to be disposed on the other electrode 121 Aab can be positioned efficiently. As a result, the width of the terminal substrate 102b can be reduced, which leads to further size reductions of the optical module.

While the optical modulator has been described as an example of the optical module in each of the above embodiments, the optical module may also apply to an optical switch that has the same configuration as the configuration of the optical module and that performs switching operations through reversal of the voltage applied to the electrodes 121.

According to an embodiment, the size of an optical module can be reduced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical module comprising:
a waveguide substrate including an optical waveguide and a plurality of electrodes that apply an electronic signal to the optical waveguide;
a relay substrate disposed adjacent to the waveguide substrate;
a terminal substrate disposed adjacent to the waveguide substrate and opposite to the relay substrate across the waveguide substrate; and
a carrier substrate on which the waveguide substrate, the relay substrate, and the terminal substrate are mounted, wherein
the plurality of electrodes have a first interconnect unit extending from the relay substrate to the terminal substrate via the waveguide substrate and second interconnect units extending from the first interconnect unit and branching on the terminal substrate,
a first interconnect branch among the second interconnect units includes a capacitor and a terminal resistor, and
a second interconnect branch among the second interconnect units is connected to an interconnect of the carrier substrate via a bias resistor, passes under the waveguide substrate, and extends to a DC electrode for bias-adjusting on the relay substrate.

2. The optical module according to claim 1, wherein an interconnect of the carrier substrate is disposed on a surface of the carrier substrate.

3. The optical module according to claim 1, wherein the carrier substrate is a laminated substrate, and an inner layer interconnect of the carrier substrate is used for an interconnect of the carrier substrate.

4. The optical module according to claim 2, wherein an inner layer interconnect of a different layer of the carrier substrate and corresponding to the plurality of electrodes, is used for the second interconnect branch.

5. The optical module according to claim 4, wherein an inner layer interconnect at an identical position in a different layer of the carrier substrate is used for the second interconnect branch.

6. The optical module according to claim 1, wherein the terminal substrate and the carrier substrate are integrated.

7. The optical module according to claim 6, wherein a recess in which the waveguide substrate and the relay substrate are disposed is formed on a surface of the carrier substrate.

8. The optical module according to claim 1, wherein the second interconnect units are divided into a first group extending in a first direction along the optical waveguide and a second group extending in a direction opposite to the first direction.

9. The optical module according to claim 1, wherein the plurality of electrodes that apply an electronic signal to the optical waveguide include a plurality of RF electrodes that apply a high-frequency electronic signal for modulation and a plurality of the DC electrodes,
the plurality of RF electrodes is collectively arranged as an RF terminal group on the relay substrate, separately from a DC terminal group of the DC electrodes.

10. The optical module according to claim 9, wherein the RF terminal group is arranged to have a pitch that is wider than a pitch of the DC terminal group, and the second interconnect branch is arranged in a layout corresponding to the pitch of the DC terminal group.

11. The optical module according to claim 1, wherein the waveguide substrate includes a phase-adjusting DC electrode disposed along the optical waveguide,
the phase-adjusting DC electrode is extended to the relay substrate via an interconnect of the carrier substrate.

12. An optical transmitter comprising:
an optical module configured to include:
a waveguide substrate including an optical waveguide and a plurality of electrodes that apply an electronic signal to the optical waveguide;
a relay substrate disposed adjacent to the waveguide substrate;
a terminal substrate disposed adjacent to the waveguide substrate and opposite to the relay substrate across the waveguide substrate; and
a carrier substrate on which the waveguide substrate, the relay substrate, and the terminal substrate are mounted, wherein
the plurality of electrodes have a first interconnect unit extending from the relay substrate to the terminal substrate via the waveguide substrate and second interconnect units extending from the first interconnect unit and branching on the terminal substrate,
a first interconnect branch of the second interconnect units includes a capacitor and a terminal resistor, and
a second interconnect branch of the second interconnect units is connected to an interconnect of the carrier substrate via a bias resistor, passes under the waveguide substrate, and extends to a DC electrode for bias-adjusting on the relay substrate;
a data generating unit configured to supply separate transmission data as the electronic signals, to the plurality of electrodes, and supply a drive signal for modulation through the optical waveguide; and
a bias control circuit that performs control so that polarization directions of light at the optical waveguide become orthogonal to each other.

13. The optical module according to claim 3, wherein an inner layer interconnect of a different layer of the carrier substrate and corresponding to the plurality of electrodes, is used for the second interconnect branch.

14. The optical module according to claim 13, wherein an inner layer interconnect at an identical position in a different layer of the carrier substrate is used for the second interconnect branch.

* * * * *